US006908063B2

(12) United States Patent
Bearman et al.

(10) Patent No.: US 6,908,063 B2
(45) Date of Patent: Jun. 21, 2005

(54) VORTEX SHEDDING AND DRAG FORCE REDUCTION

(75) Inventors: Peter William Bearman, Surrey (GB); John Owen, Worcester (GB); Albin Anthony Szewczyk, South Bend, IN (US)

(73) Assignee: Imperial College of Science, Technology and Medicine, London (GB)

( * ) Notice: Subject to any disclaimer, the term of this patent is extended or adjusted under 35 U.S.C. 154(b) by 0 days.

(21) Appl. No.: 10/296,969

(22) PCT Filed: May 31, 2001

(86) PCT No.: PCT/GB01/02447

§ 371 (c)(1), (2), (4) Date: Jul. 15, 2003

(87) PCT Pub. No.: WO01/92733

PCT Pub. Date: Dec. 6, 2001

(65) Prior Publication Data

US 2004/0051004 A1 Mar. 18, 2004

(30) Foreign Application Priority Data

Jun. 1, 2000 (GB) .............................................. 0013334

(51) Int. Cl.[7] .................................................. B64C 1/38

(52) U.S. Cl. .......................... 244/130; 244/199; 138/39

(58) Field of Search ................................ 244/130, 199; 138/37, 39, 177

(56) References Cited

U.S. PATENT DOCUMENTS

| | | | | | |
|---|---|---|---|---|---|
| 3,463,418 A | * | 8/1969 | Miksch | | 244/199 |
| 3,578,264 A | * | 5/1971 | Kuethe | | 244/199 |
| 4,059,129 A | | 11/1977 | Feis | | 138/37 |
| 5,114,099 A | * | 5/1992 | Gao | | 244/130 |
| 5,205,519 A | * | 4/1993 | Creel | | 244/198 |
| 5,803,409 A | * | 9/1998 | Keefe | | 244/206 |
| 5,860,626 A | | 1/1999 | Moser | | 244/200 |
| 5,988,568 A | * | 11/1999 | Drews | | 244/200 |
| 6,048,136 A | | 4/2000 | Denison et al. | | 405/211 |

FOREIGN PATENT DOCUMENTS

| | | |
|---|---|---|
| GB | 244520 | 12/1925 |
| GB | 1522213 | 7/1978 |
| GB | 2162610 A | 2/1986 |
| GB | 2335248 A | 9/1999 |
| WO | 94/02744 | 2/1994 |

OTHER PUBLICATIONS

S. Mizuno, "Effects of Three–Dimensional Roughness Elements on the Flow Around a Circular Cylinder" *J. Sci. Hiroshima Univ.*, Ser. A–II, vol. 34, No. 3, pp. 215–258 Dec. 1970.

M.M. Dzravkovich;"Review and Classification of Various Aerodynamic and Hydrodynamic Means for Suppressing Vortex Shedding"; *Journal of Wind Engineering and Industrial Aerodynamics*; vol. 7; 1981; pp 145–189 (XP001023833).

* cited by examiner

*Primary Examiner*—J. Woodrow Eldred
(74) *Attorney, Agent, or Firm*—Nixon & Vanderhye P.C.

(57) ABSTRACT

Smoothly curved protuberances (8, 26, 34) are added to an elongate body (2, 16, 18, 20, 22, 32) to modify the fluid flow to reduce the drag Force $F_{drag}$ and the forces induced by vortex shedding $F_{vortex}$. The protuberances can be arranged in diametrically opposed pairs with longitudinally adjacent pairs having different radial directions first to cope with fluid flow from a variety of different directions.

32 Claims, 5 Drawing Sheets

FIG. 2
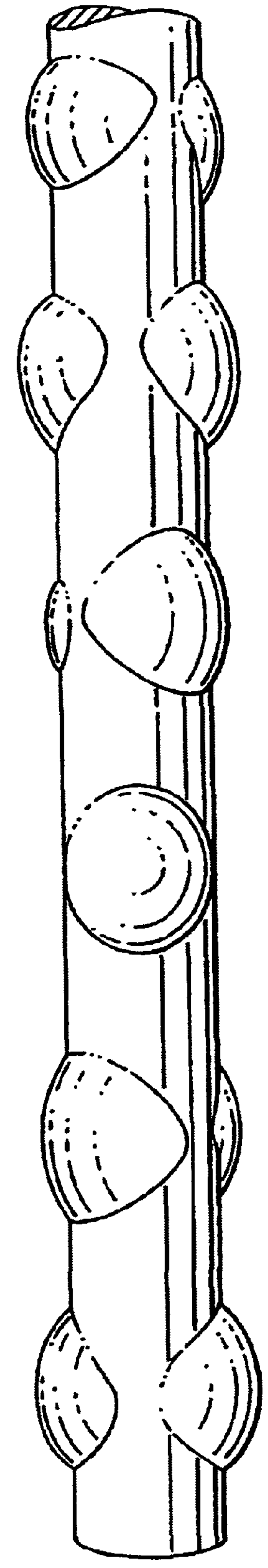
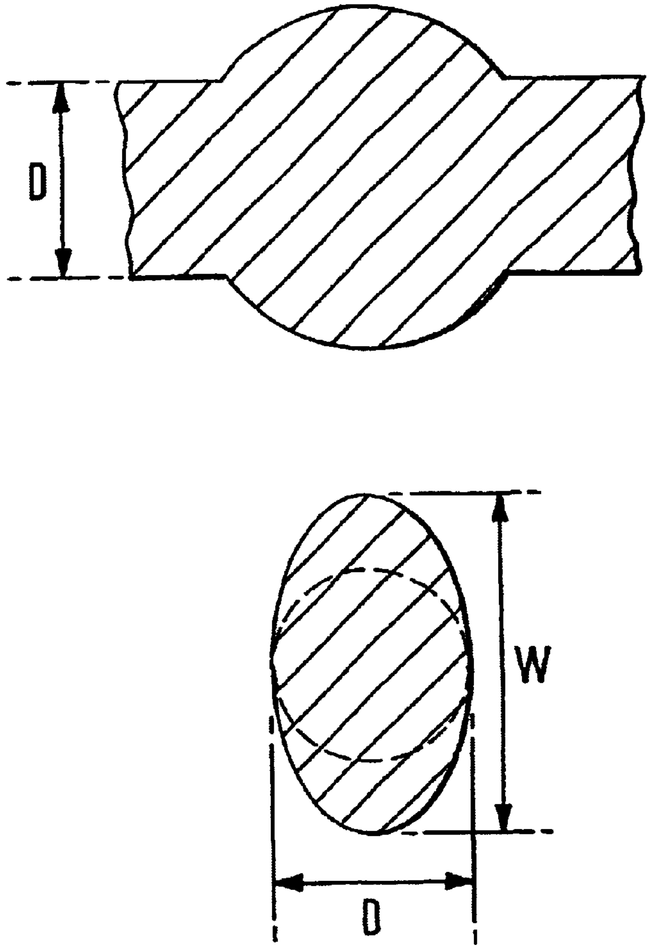
FIG. 3

VORTEX SHEDDING AND DRAG FORCE REDUCTION

This application is the US national phase of international application PCT/GB01/02447 filed 31 May 2001, which designated the U.S.

This invention relates to techniques for modifying fluid flow so as to reduce the effects of drag and vortex shedding. More particularly, this invention relates to such techniques that may be applied to elongate bodies.

When an elongate body, such as a chimney, is positioned within an environment where it is subject to fluid flow, in the case of a chimney airflow, then a drag force is exerted on the elongate body and vortex shedding can occur inducing forces that can lead to undesirable vibration. The drag force of passing fluid flow often means that the elongate body has to be produced with a strengthened structure to resist such a drag force. The cost of strengthening the structure in this way can be significant. In the case of vortex shedding, the forces this exerts vary with time in a manner that can establish highly damaging undesirable vibrations within an elongate body. It may be that these vibrations will stimulate a resonance with potentially destructive consequences.

It is known to fit fairings to structures in order to modify fluid flow around those structures to reduce drag. A problem with such fairings is that they are usually only able to cope with fluid flow from a single direction and if the fluid flow direction changes, then they may be ineffective, or in fact increase drag. The fairings may be made movable to accommodate different flow directions, but this disadvantageously increases their cost and complexity.

It is also known to attach structures to elongate bodies in an attempt to reduce vortex shedding. An example of this is a helical strake that can be applied to the outside of a chimney. Whilst such a helical strake may reduce vortex shedding, it often has the effect of increasing drag with a disadvantageous need to increase the strength of the chimney. An alternative is the use of a perforated shroud over a chimney. Such perforated shrouds have been found to be too expensive to be practical.

U.S. Pat. No. 4,059,129 discloses a cylindrical body with a plurality of small planes extending from its outer surface acting as vortex generators to reduce vibrations due to transverse flow against the body.

Discussions of vortex shedding may be found in E. Naudascher, D. Rockwell "FLOW-INDUCED VIBRATIONS an Engineering Guide", IAHR-AIRH, Hydraulic structures design manual, A. A, Balkema/Rotterdam/Brookfield/1994, 160–176 and M. M. Zdravkovich, "Review and Classification of Various Aerodynamic and Hydrodynamic Means for Suppressing Vortex Shedding," Journal of Wind Engineering and Industrial Aerodynamics, 7 (1981) 145–189.

A description of a unidirectional fairing for use on a drilling riser to reduce vortex induced vibration is described in United States Patent U.S. Pat. No. 6,048,136.

Viewed from one aspect the present invention provides an elongate body (2) having a plurality of longitudinally spaced apart smoothly curved protuberances (8) extending therefrom, said protuberances having a surface which is smoothly curved in two orthogonal directions and being shaped and dimensioned to modify fluid flow around said elongate body in a manner that reduces forces upon said elongate body produced by drag and vortex shedding.

The invention recognises and exploits the phenomenon whereby a smoothly curved protuberance (smooth at least in the sense of how it modifies the fluid flow) from an elongate body can be made to modify the fluid flow around that body in a manner that reduces the forces exerted on the body by drag and vortex shedding. The protuberance is advantageously simple and inexpensive to provide with or add to an elongate body.

Whilst the invention could be used in situations where the fluid flow was unidirectional, in preferred embodiments of the invention said protuberances extend in a plurality of different radial directions from a longitudinal axis of said elongate body.

This feature of the invention allows fixed protuberances that are inexpensive and simple to reduce drag and vortex shedding that can occur from fluid flow incident from any radial direction around the elongate body. This is strongly advantageous since, for example, a chimney or a drilling platform leg may be subject to fluid flow from any radial direction.

It will be appreciated that the differences between the radial direction of adjacent protuberances may vary over a range of values. It has been found that a preferred range of values for the differences between radial directions is 30 degrees to 90 degrees inclusive. A particularly preferred arrangement that works well in many cases is when the difference in radial direction between adjacent protuberances is substantially 45 degrees.

The protuberances could be applied to a single side of the elongate body. However, in preferred embodiments the protuberances are arranged in pairs at the same longitudinal position along the elongate body and with opposite radial directions. This has been found to be constructionally convenient and provide good omni-directional performance.

The size of the protuberances can vary significantly depending upon the circumstances. Generally speaking, more dense fluids may require more pronounced protuberances than less dense fluids. It will also be appreciated that the protuberances should not be too large or they may result in an undesirably large increase in drag when the fluid flow is not favourably aligned with them.

Compared with the maximum diameter D of the cross-section of the elongate body, a preferred range of protuberance sizes has been found to be one in which the protuberances extend from an outer surface of the elongate body by a distance within the range 0.1 D to 0.75 D. A more highly preferred range is 0.25 D to 0.5 D.

The longitudinal spacing of the protuberances can also vary. Placing the protuberances too close together will increase cost and weight whilst it may also reduce the effectiveness of the protuberances in modifying the fluid flow in the desired manner. Similarly, placing the protuberances too far apart will make them ineffective. In preferred embodiments of the invention the longitudinal spacing of the protuberances is such that said radial directions of said protuberances vary along said longitudinal axis in a repeating pattern with a repeat distance within the range 3 D to 9 D inclusive.

It will be appreciated that the smoothly curved protuberances could have a wide variety of cross-sectional shapes. The protuberances should be smoothly curved and blend well into the shape of the rest of the elongate body so as to reduce drag. has been found to produce good results is when the cross-sectional shape of the protuberances is at least a potion of an ellipse. When the protuberances are paired together, they may be arranged in a fashion in which the back-to-back protuberances have a combined cross-sectional shape that is a full ellipse.

The elongate body to which the protuberances are attached could similarly have a range of cross-sectional shapes. However, a circular cross-sectional shape is common in bodies that are subject to the drag and vortex shedding forces which the invention seeks to reduce and this shape has been found to benefit well from the technique of the present invention.

The elongate body around which the fluid flow is modified by the technique of the present invention could be part of a wide variety of different structures. Examples of structures that may particularly benefit from the technique of the invention are an offshore riser, a support member of an offshore platform, a pipe, an underwater cable, chimney and a support tower for a wind turbine.

It will be appreciated that the fluid which gives rise to the drag and vortex shedding may be either a liquid or a gas.

The protuberances could be integrally formed with the elongate body with which they are associated. However, in preferred embodiments of the invention the protuberances may take the form of fairings (e.g. an element added to modify fluid flow) that are attached to an elongate body. The engineering of many elongate bodies is in many cases already fixed and the form of the invention as add-on fairings is particularly convenient and simple together with allowing the possibility for retro-fitting.

Viewed from another aspect the present invention provides a method of reducing fluid flow induced forces upon an elongate body produced by drag and vortex shedding, said method comprising the step of providing a plurality of fluid flow modifying longitudinally spaced apart smoothly curved protuberances extending from said elongate body, said protuberances having a surface which is smoothly curved in two orthogonal directions.

Viewed from a further aspect the present invention provides a kit for modifying fluid flow around an elongate body, said kit comprising a plurality of smoothly curved firings for fixing to said elongate body and a plurality of fairing fasteners for fixing said fairings to said elongate body to form a plurality of longitudinally spaced apart smoothly curved protuberances extending therefrom, said protuberances having a surface which is smoothly curved in two orthogonal directions and being shaped and dimensioned to modify fluid flow around said elongate body in a manner that reduces forces upon said elongate body produced by drag and vortex shedding.

Supplying the fairings and associated fasteners as a kit is a likely way in which the invention may be embodied in circumstances when it is desired to retro-fit existing structures.

Embodiments of the invention will now be described, by way of example only, with reference to the accompanying drawings in which:

FIG. 1 schematically illustrates fluid flow past a circular cross-section body with associated drag and vortex shedding;

FIG. 2 illustrates a cylindrical elongate body having flow modifying protuberances attached thereto;

FIG. 3 illustrates cross-sectional views of a pair of flow modifying protuberances;

Figure 1:
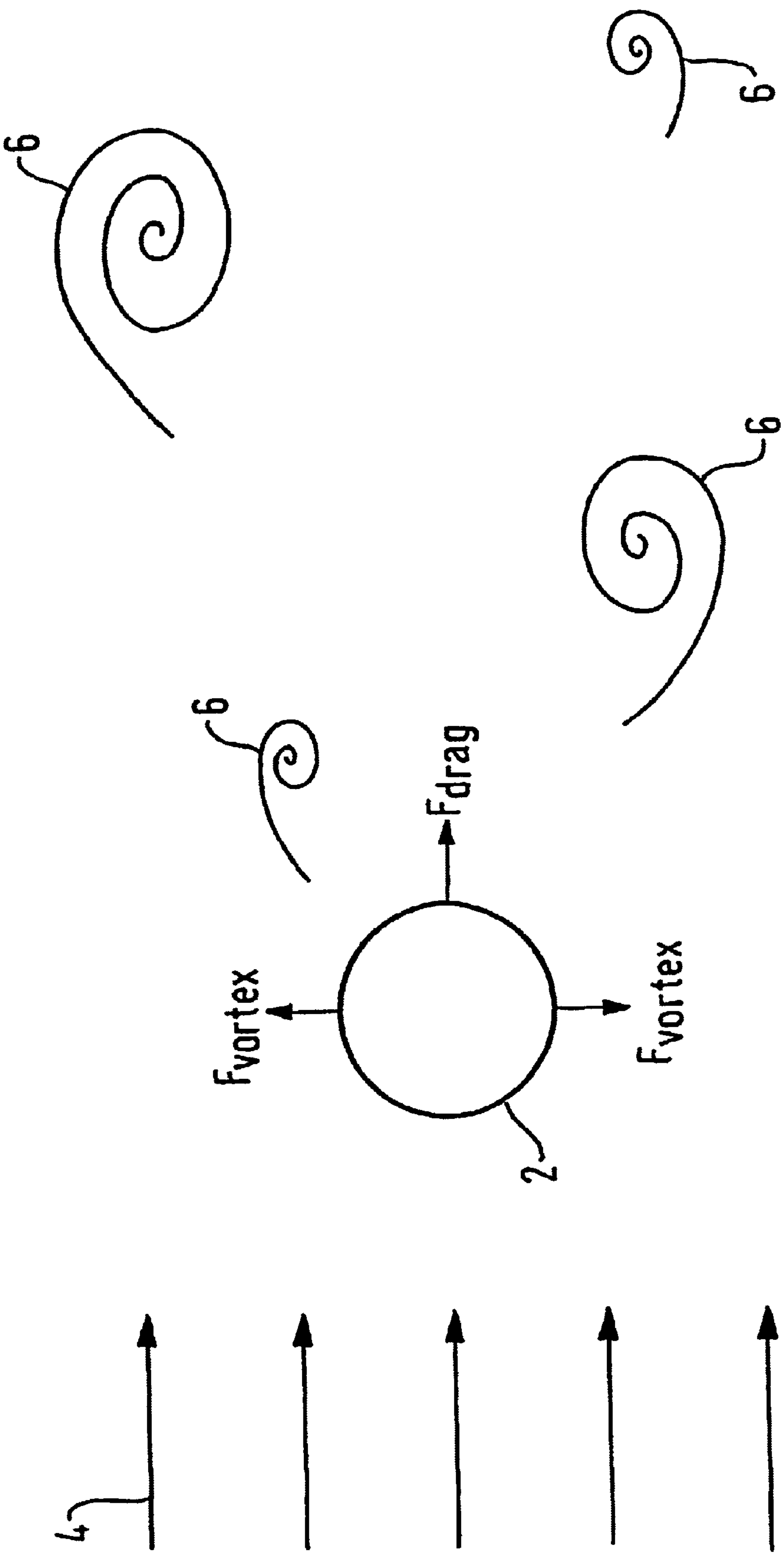
Figure 4:
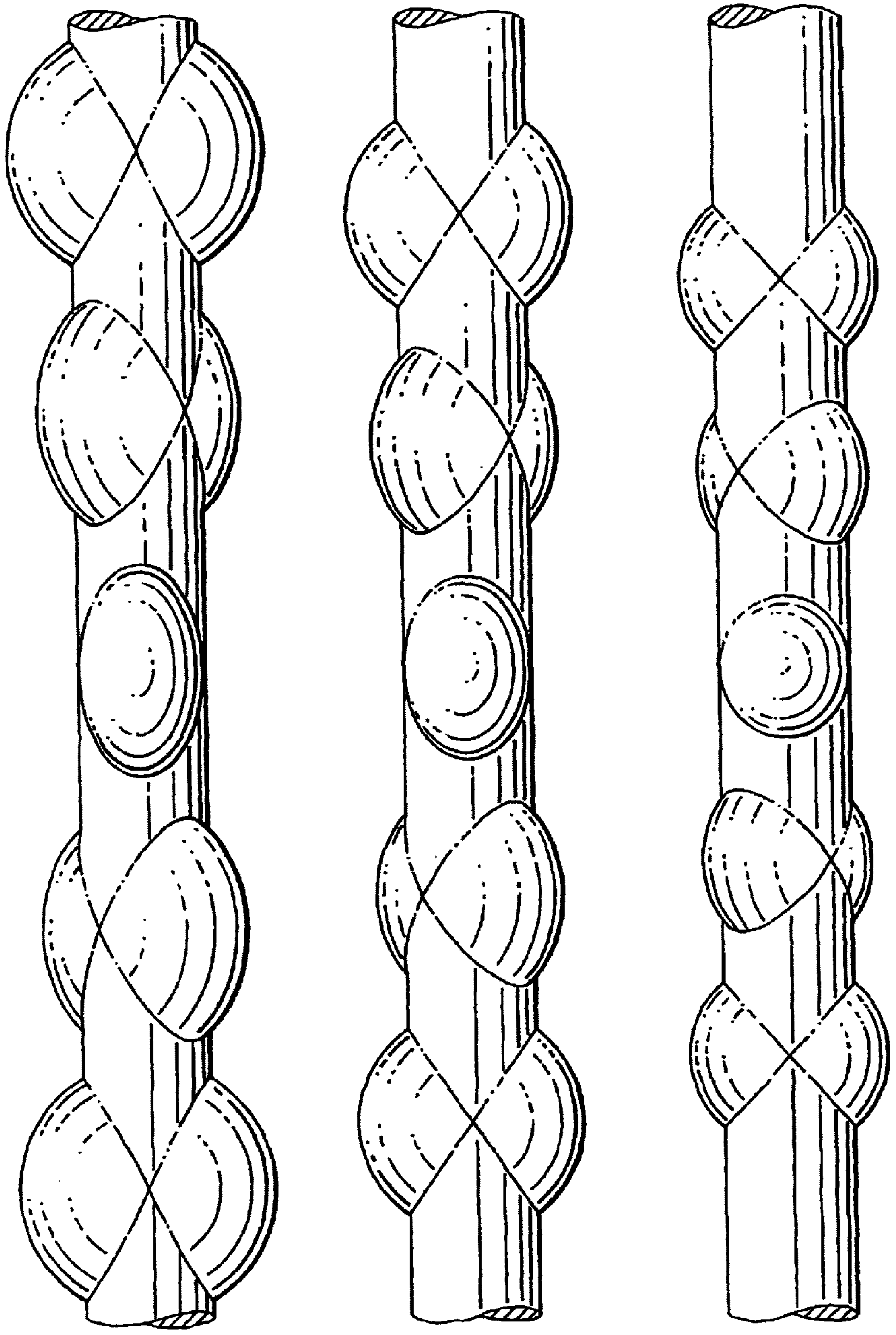
FIG. 4 illustrates a range of protuberances sizes applied to a cylindrical body.
Figure 5:
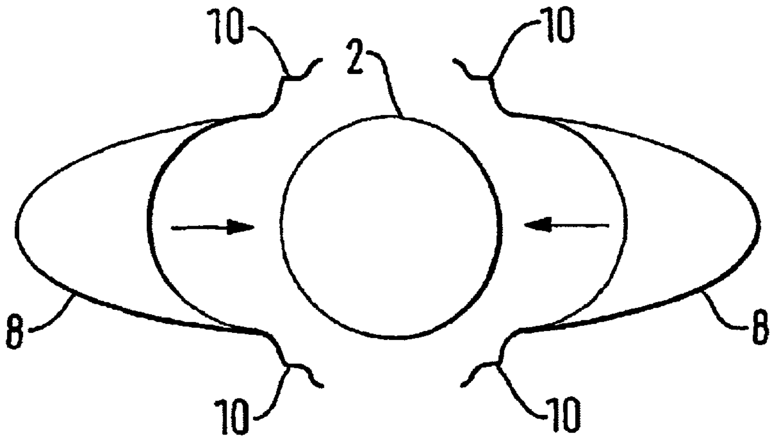
FIG. 5 illustrates a kit form of the protuberances.
Figure 6:
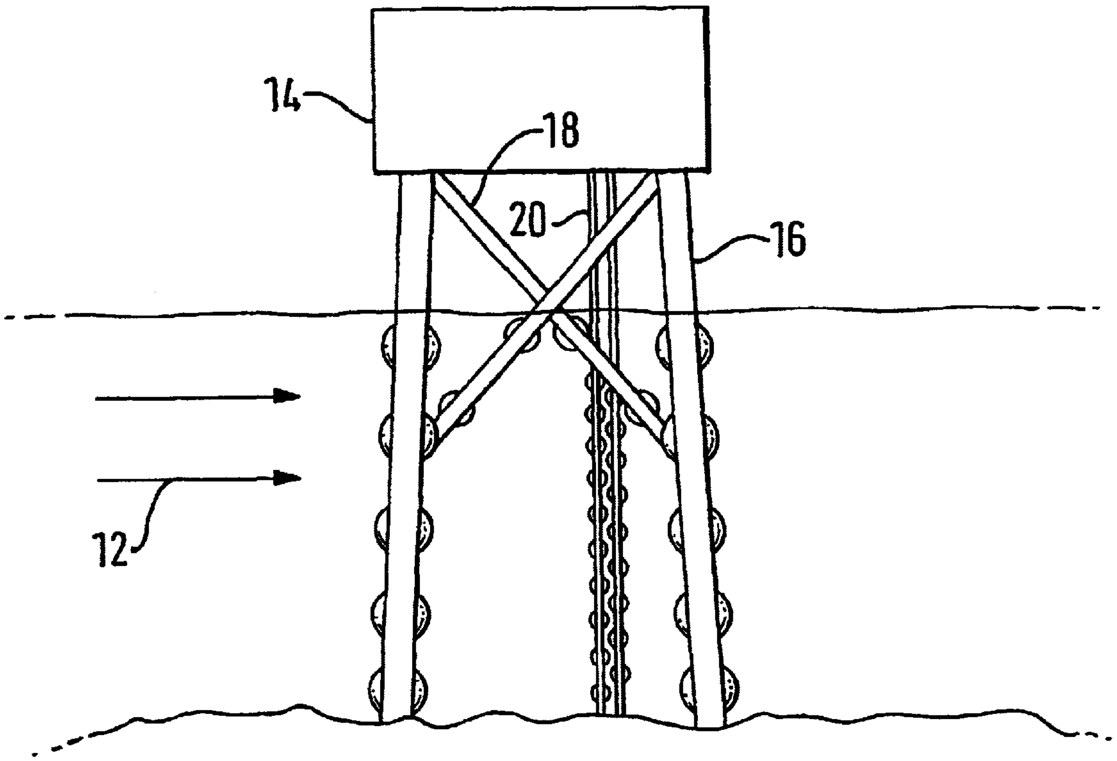
FIGS. 6, 7 and 8 illustrate possible uses of the invention.
Figure 7:
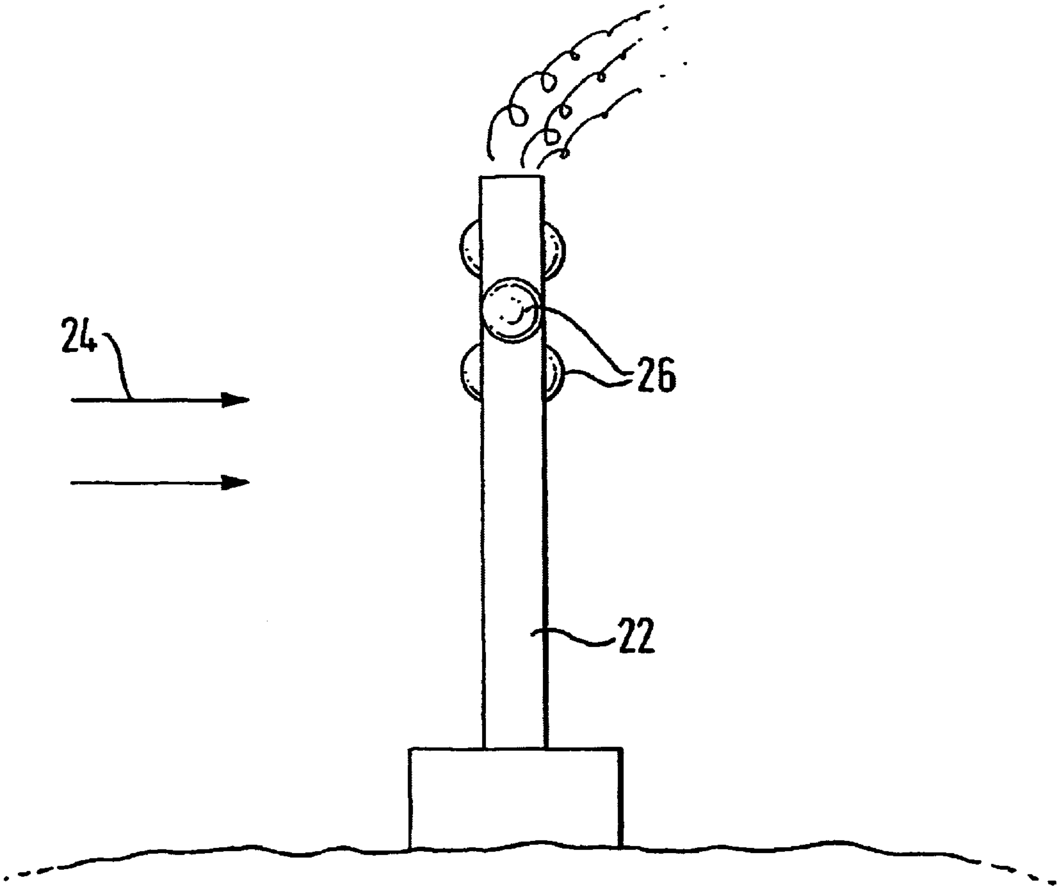
Figure 8:
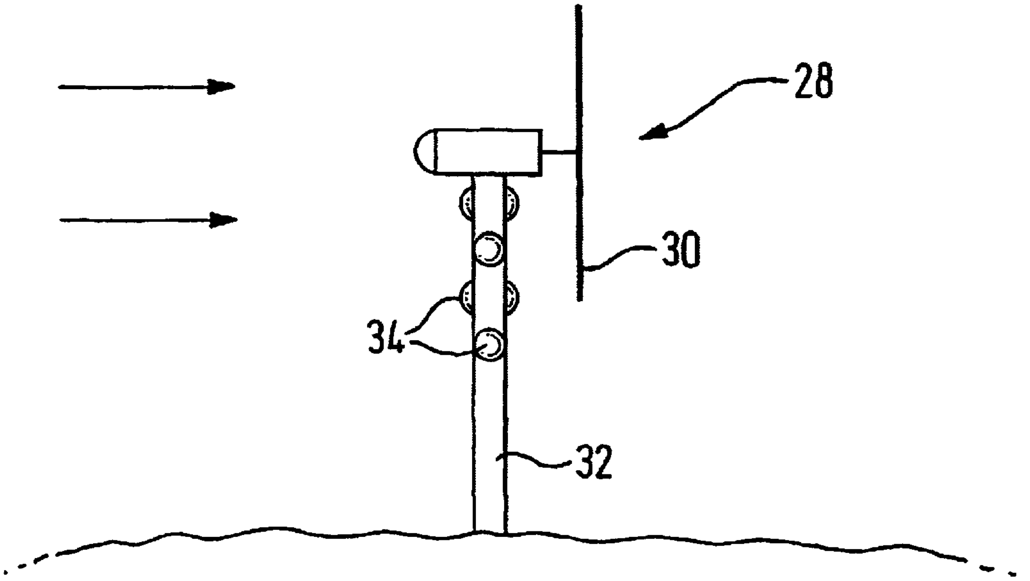

FIG. 1 schematically illustrates a cylindrical body 2 positioned within a fluid flow 4. The fluid flow 4 gives rise to a drag force $F_{drag}$ acting in the same direction as the fluid flow 4. Vortices 6 are shed from alternating sides of the cylinder 2 and moved downstream within the fluid flow 4. As these vortices 6 are shed, they subject the cylinder 2 to a varying vortex shedding force $F_{vortex}$ that is of a generally periodic nature. The vortex shedding force $F_{vortex}$ can vary in magnitude, direction and timing.

The drag force $F_{drag}$ can necessitate an undesirable need to increase the structural strength of the cylinder 2. The vortex shedding force $F_{vortex}$ can similarly require the structure of the cylinder to be strengthened as well as raising the possibility of inducing undesirable vibrations, or even resonance, within the cylinder 2.

FIG. 2 illustrates an elongate body in the form of a cylinder to which smoothly curved protuberances have been added. These protuberances are arranged in diametrically opposed pairs with the radial direction of the protuberances varying by substantially 45 degrees between adjacent pairs of protuberances. In a test the arrangement illustrated in FIG. 2 produced a 24% drag reduction compared with the plain cylinder and also led to significantly less vortex-induced vibration.

In the specific example illustrated in FIG. 2, the protuberances have an elliptical cross-section and protrude by 0.5 D from the surface of the cylinder where D is the diameter of the cylinder. The protuberances are spaced at an interval of 1.75 D along the length of the cylinder in an arrangement where the orientation of the protuberances repeats at a distance of 7 D.

FIG. 3 schematically illustrates cross-sectional views through a pair of protuberances as illustrated in FIG. 2. The end view shows the elliptical form of the protuberances. In the illustrated example, the major axis of the ellipse is W in length and the minor axis of the ellipse is D in length corresponding to the diameter of the cylinder D on which the protuberance is mounted. The plan view shows the protuberances to have a plan cross-section that is part of a circle of diameter W.

What is claimed is:

1. An elongate body having a diameter D transverse to a direction of fluid flow around said body, said body including a means for reducing drag and vortex shedding from said body, said means for reducing comprising a plurality of longitudinally spaced apart smoothly curved protuberances extending from said body, said protuberances extending from said body a distance at least 0.1 D and having a surface which is smoothly curved in two orthogonal directions, said surface is shaped and dimensioned for modifying said fluid flow around said elongate body in a manner that reduces forces upon said elongate body produced by drag and vortex shedding.

2. An elongate body as claimed in claim 1, wherein said protuberances extend in a plurality of different radial directions from a longitudinal axis of said elongate body.

3. An elongate body as claimed in claim 2, wherein longitudinally adjacent protuberance, have radial directions differing by an angle within the range 30 to 90 degrees inclusive.

4. An elongate body as claimed in claim 3, wherein longitudinally adjacent protuberances have radial directions differing by an angle of substantially 45 degrees.

5. An elongate body as claimed in claim 1, wherein at least two of said protuberances are arranged as a pair of protuberances having a common longitudinal position along said elongate body and extending in opposite radial directions from said elongate body.

6. An elongate body as claimed in claim 5, wherein all of said protuberances are arranged as pairs of protuberances.

7. An elongate body as claimed in claim 1 having a maximum cross-sectional diameter excluding said protuberances of D.

8. An elongate body as claimed in claim 7, wherein said protuberances extend from an outer surface of said elongate body excluding said protuberances by a distance within the range 0.1 D to 0.75 D inclusive.

9. An elongate body as claimed in claim 8, wherein said protuberances extend from an outer surface of said elongate body excluding said protuberances by a distance within the range 0.25 D to 0.5 D inclusive.

10. An elongate body as claimed in claim 3, wherein said radial directions of said protuberances vary along said longitudinal axis in a repeating pattern with a repeat distance within the range 3 D to 9 D inclusive.

11. An elongate body as claimed in claim 1, wherein said protuberances have a cross-sectional shape substantially corresponding to at least a portion of an ellipse.

12. An elongate body as claimed in claim 1, wherein said elongate body has a cross-sectional shape substantially corresponding to a circle.

13. An elongate body as claimed in claim 1, wherein said elongate body is one of:

an offshore riser;

a support member of an offshore platform;

a pipe;

an underwater cable;

a chimney; and a support tower for a wind turbine.

14. An elongate body as claimed in claim 1, wherein said fluid flow is liquid flow.

15. An elongate body as claimed in claim 1, wherein said fluid flow is gas flow.

16. An elongate body as claimed in claim 1, wherein said protuberances are formed as fairings fixed to said elongate body.

17. A method of reducing fluid flow induced forces upon an elongate body produced by drag and vortex shedding, said body having a dimension D transverse to said fluid flow, said method comprising the step of providing a plurality of fluid flow modifying longitudinally spaced apart smoothly curved protuberances extending from said elongate body a distance equal to at least 0.1 D, said protuberances having a surface which is smoothly curved in two orthogonal directions.

18. A kit for modifying fluid flow around an elongate body, said body having a dimension D transverse to said fluid flow, said kit comprising:

a plurality of smoothly curved fairings for fixing to said elongate body; and a plurality of fairing fasteners for fixing said fairings to said elongate body to form a plurality of longitudinally spaced apart smoothly curved protuberances extending from said body a distance equal to at least 0.1 D, said protuberances having a surface which is smoothly curved in two orthogonal directions and being shaped and dimensioned to modify said fluid flow around said elongate body in a manner that reduces forces upon said elongate body produced by drag and vortex shedding.

19. An elongate body, said body having a dimension D transverse to said fluid flow, said body having a plurality of longitudinally spaced apart smoothly curved protuberances extending therefrom, said protuberances having a surface which is smoothly curved in two orthogonal directions, said protuberances extending a distance equal to at least 0.1 D in a plurality of different radial directions from a longitudinal axis of said elongate body.

20. An elongate body as claimed in claim 19, wherein longitudinally adjacent protuberances have radial directions differing by an angle of substantially 45 degrees.

21. An elongate body as claimed in claim 19, wherein at least two of said protuberances are arranged as a pair of protuberances having a common longitudinal position along said elongate body and extending in opposite radial directions from said elongate body.

22. An elongate body as claimed in claim 19 having a maximum cross-sectional diameter excluding said protuberances of D.

23. An elongate body as claimed in claim 22, wherein said protuberances extend from an outer surface of said elongate body excluding said protuberances by a distance within the range 0.1 D to 0.75 D inclusive.

24. An elongate body as claimed in claim 23, wherein said protuberances extend from an outer surface of said elongate body excluding said protuberances by a distance within the range 0.25 D to 0.5 D inclusive.

25. An elongate body as claimed in claim 19, wherein said elongate body is one of:

an offshore riser;

a support member of an offshore platform;

a pipe;

an underwater cable;

a chimney; and a support tower for a wind turbine.

26. A method as claimed in claim 17, wherein, said protuberances extend in a plurality of different radial directions from a longitudinal axis of said elongate body.

27. A method as claimed in claim 17, wherein longitudinally adjacent protuberances have radial directions differing by an angle of substantially 45 degrees.

28. A method as claimed in claim 17, wherein at least two of said protuberances are arranged as a pair of protuberances having a common longitudinal position along said elongate body and extending in opposite radial directions from said elongate body.

29. A method as claimed in claim 17, wherein said elongate body has a maximum cross-sectional diameter excluding said protuberances of D.

30. A method as claimed in claim 29, wherein said protuberances extend from an outer surface of said elongate body excluding said protuberances by a distance within the range 0.1 D to 0.75 D inclusive.

31. A method as claimed in claim 30, wherein said protuberances extend from an outer surface of said elongate body excluding said protuberances by a distance within the range of 0.25 D to 0.5 D inclusive.

32. A method as claimed in claim 17, wherein said elongate body is one of:

an offshore riser;

a support member of an offshore platform;

a pipe;

an underwater cable;

a chimney; and a support tower for a wind turbine.

* * * * *